United States Patent [19]

Tisma

[11] Patent Number: 4,716,714
[45] Date of Patent: Jan. 5, 1988

[54] APPARATUS WITH REPLACEABLE TRAYS ON AUTOMATIC PACKAGING MACHINES

[75] Inventor: Steven Tisma, Chicago, Ill.

[73] Assignee: Tisma Machine Corporation, Chicago, Ill.

[21] Appl. No.: 905,708

[22] Filed: Sep. 9, 1986

[51] Int. Cl.[4] .......................... B65B 9/00; B65B 47/00
[52] U.S. Cl. ......................................... 53/575; 53/579;
 53/251; 198/803.1
[58] Field of Search .......................... 53/575, 579, 251;
 198/802, 803.01

[56] References Cited

U.S. PATENT DOCUMENTS

| | | | |
|---|---|---|---|
| 3,578,144 | 5/1971 | Punzak | 198/803.01 |
| 3,610,407 | 10/1971 | Prodzenski | 198/803.01 |
| 3,786,910 | 1/1974 | Wallis | 198/802 |
| 4,015,403 | 4/1977 | Langen | 53/575 |
| 4,578,929 | 4/1986 | Tisma | 53/251 X |

Primary Examiner—John Sipos
Attorney, Agent, or Firm—Laff, Whitesel, Conte & Saret

[57] ABSTRACT

An automatic packaging machine having a conveyor which travels over a fixed and closed path. a plurality of carriers are mounted at fixed intervals along the conveyor. A tray having a fixed physical dimensions, is mounted on the carrier to carry an object having the same dimensions. The tray is releasably locked onto the carrier by at least two inverted, bolt-like interconnectors located at positions displaced along the length of a support plate which is on the carrier. A key hole in the support plate receives a head on one of the bolt-like interconnectors which passes through and then slide along the length of and is captured in a small end of the key hole slot. A leaf spring snaps over the head of one bolt as it slides in the key hole slot. The leaf spring is flexed away from the bolt head to release the tray.

6 Claims, 6 Drawing Figures

APPARATUS WITH REPLACEABLE TRAYS ON AUTOMATIC PACKAGING MACHINES

This invention relates to apparatus for replaceable trays and more particularly to replaceable trays used on automatic packaging machines.

One known example of an automatic packaging machine is found in U.S. Pat. No. 4,578,929. Heretofore, this type of machine has been maintained by a crew of men who would repair or replace parts, change or adapt machines to set up a new production run, or the like. With the advent of microprocessors and similar control devices, these packaging machines are being redesigned to operate as unattended robots. As the machines become more self-sufficient, the number of repair men and operators is sharply reduced. The skill level of those who remain is greatly increased since they have become computor operators and service men. Then, the cost of repair and replacement becomes more expensive because there are fewer people to make the repairs and those who remain not only command higher salaries and wages but also have a lower skill level in mechanical matters. Therefore, it is desirable to elimininate those parts which require frequent maintenance.

These machines form and fill boxes which might hold almost any product, such as a finely divided product, which could be dry rice, peanut, or the like, or a single product, which could be a pouch of food to be frozen. Either the boxes or the product may be held tightly in and moved by trays during the filling process. Since there are many different sizes, shapes, and styles of boxes or products, the trays must usually be changed each time that a different box or product is used. In the past, it has been an inconvenient and time consuming work to change the trays. Also, the packaging machine is out of service during the change over of trays, which means a loss of output and revenue. Moreover, it may not always be possible to fill the boxes with products through the sam type of feeding arrangement. For example some boxes are filled from the top, while others are filled horizontally. Sometimes the box is in the loading station and the product is brought to it. Other times the product is in the loading station and the box is brought to it. Therefore, it may be necessary to move the positions of the trays as they travel from station to station. All of these considerations complicate the maintenance of the machine.

By way of example, U.S. Pat. No. 4,578,929 shows an automatic packaging machine for forming cardboard blanks into boxes. A mandrel holds and moves the blank while it is being formed into a box and then moves it past filling and sealing stations to an output area. A plurality of these mandrels are attached to and moved by conveyor chains which are usually in the form of a relatively large link or bicycle chain. When it is desirable to change the shape or size of a box, it has been necessary to unbolt and remove all of these mandrels, and then to replace them with new mandrels of a different size or shape. This is a very time consuming task.

U.S. Pat. No. 4,578,929 shows only a mandrel for holding a top fill box, but other boxes may be filled horizontally, through a side or end panel. Also, a mandrel may hold the product which is brought to a box. The mandrel may be rotated between different radially oriented position as drawn in the patent, and may be moved horizontally toward and away from a fill station. The patent does not disclose details about either bringing the product to this box or such lateral motion for horizontal loading. Nevertheless, it should be apparent that a substantial amount of man-hours would be consumed in changing a mandrel or tray especially on complicated by mechanisms which make them horizontally movable. Thus, there is a need for an easy-operating apparatus, for replaceable mandrels or trays and, at the same time, enabling the trays to move both longitudinally along a conveyor and laterally into and out of a fill position.

Accordingly, an object of this invention is to provide apparatus with easily replaceable trays. A more particular object is to provide apparatus which enables the trays to be changed easily and quickly by service men having little or no special training.

Yet another object of this invention is to provide an automatic packaging apparatus having trays which are laterally movable in order for the boxes to be filled.

In keeping with one aspect of the invention, these and other objects are accomplished by a mandrel and a tray combination which has two inverted bolt-like interconnectors. A carriage for the tray comprises a horizontal track and a leaf spring locking device. A key hole in the track of the carriage enable the bolt-like interconnectors to be inserted and slid to a locked position where the leaf spring holds it in position. Replacement of the tray is accomplished by pushing down upon the leaf spring and sliding the tray along the slot end of the key hole until the head of the bolt-like interconnector is released.

The invention will be best understood by reference to the following description of an embodiment of the invention shown in the attached drawings, in which.

Figure 3:
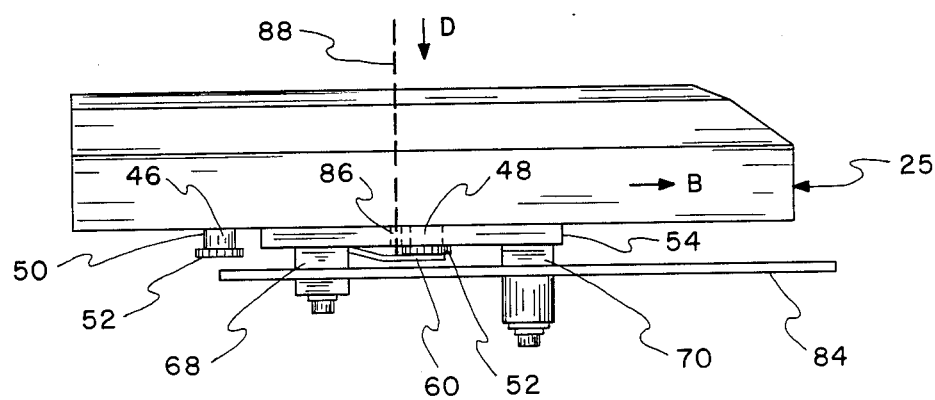
Figure 4:
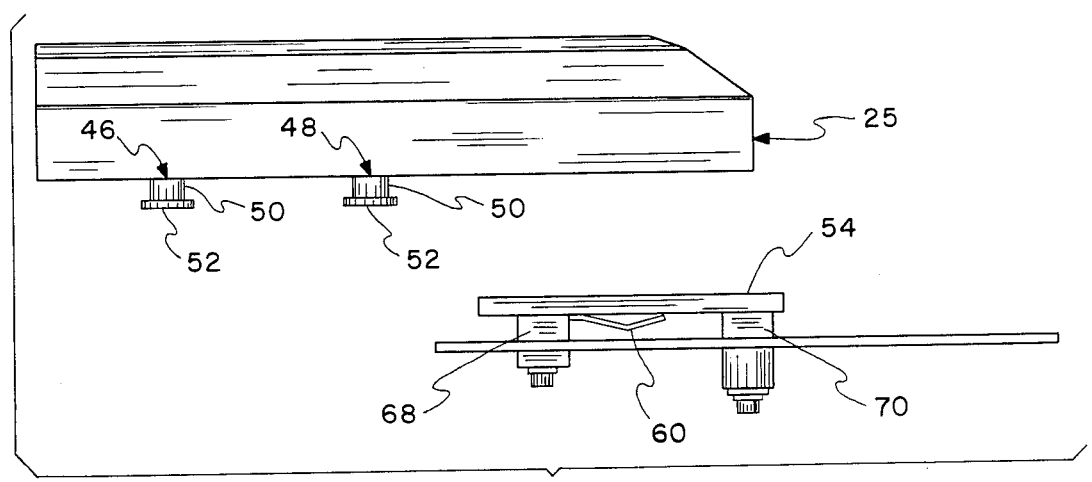
Figure 5:
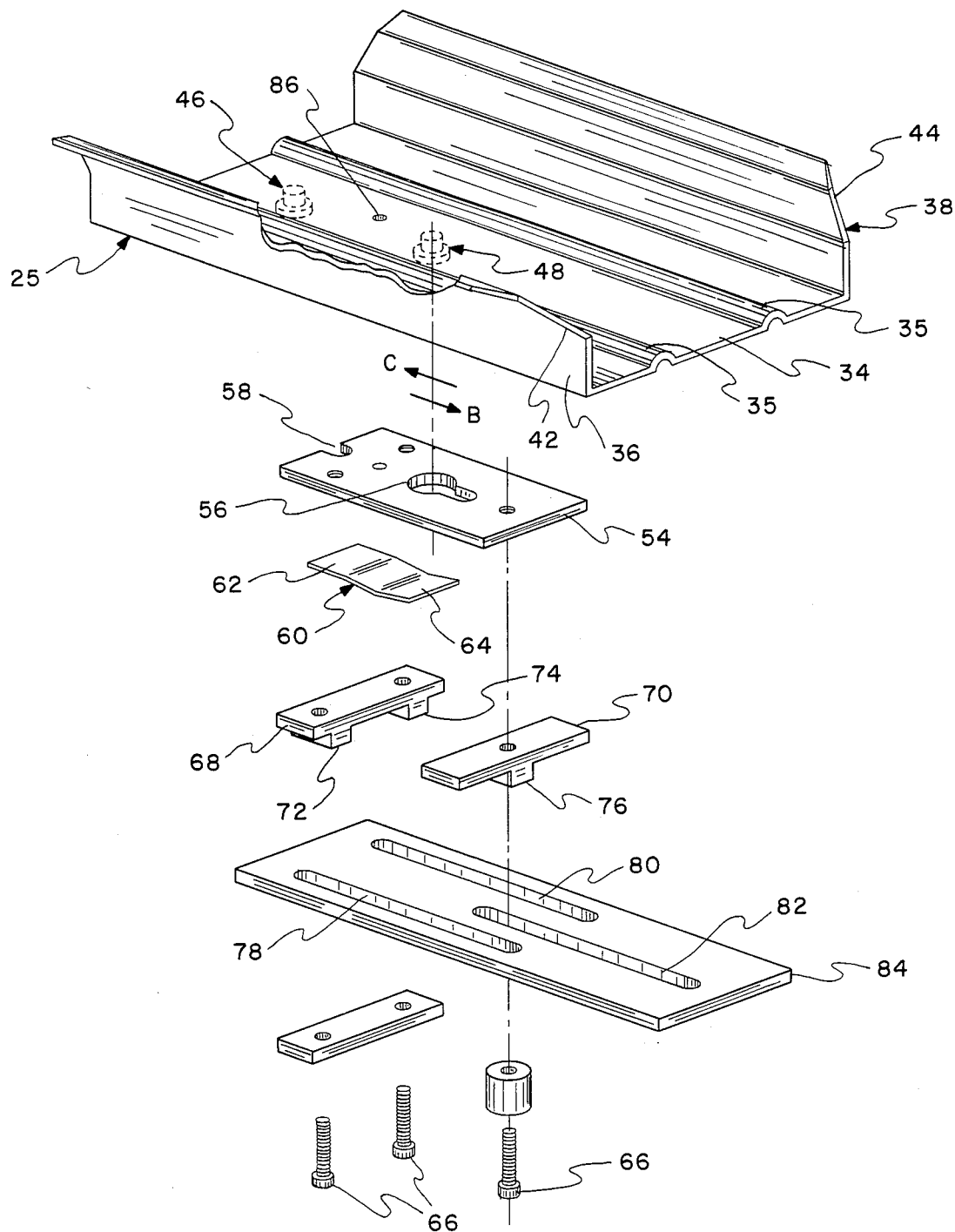

FIG. 3 schematically shows the tray and the carriage in an initial, partial disengagement position;

FIG. 4 is a side elevation which shows the tray and carriage completely disengaged from each other; and FIG. 5 is an exploded view of the tray and carriage.

Figure 1:
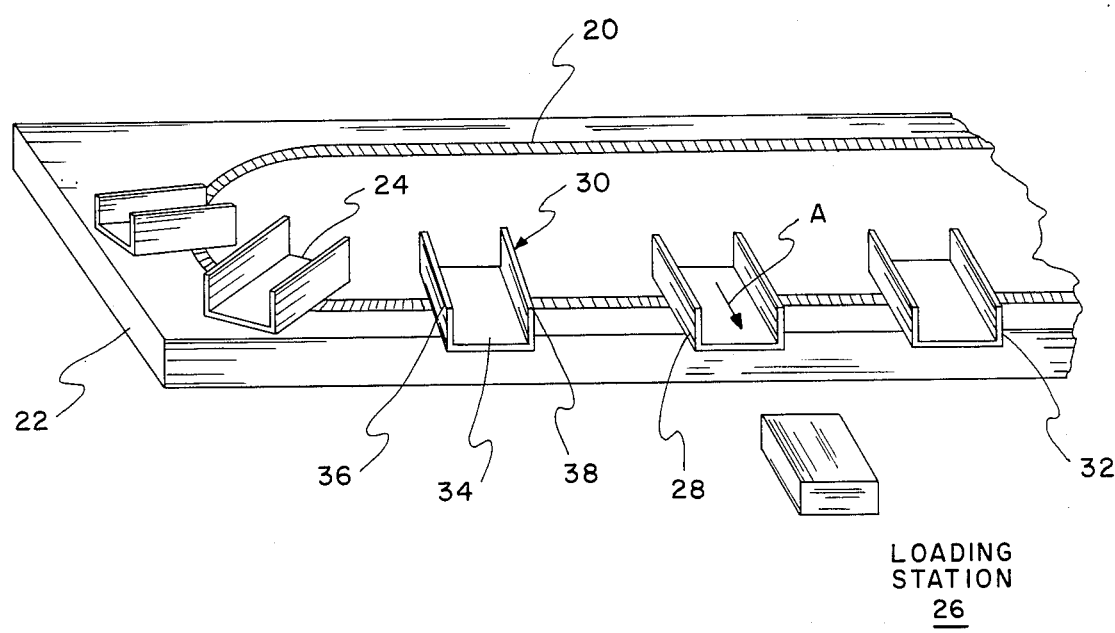
FIG. 1 is a fragment of a conveyor and loading station schematically showing the inventive tray.

Briefly, FIG. 1 shows a conveyor chain 20 mounted on any suitable support table 22. The conveyor chain 20 may be any suitable link or bicycle chain which moves over a fixed path and which carries mandrels 24. Each mandrel has a movable tray 25 which holds a box or a product and a carriage which is connected to the conveyor chain to carry the tray. While FIG. 1 shows only a few mandrels it should be understood that any suitable number of mandrels may be provided.

As the conveyor chain 20 moves the mandrels 24 around the path, they may pass one or more work stations, which are collectively and generically represented by loading station 26. The loading station includes item 27 which might be either an empty box waiting for a product or a product waiting to be inserted into an empty box. As the mandrel reaches the loading station 26, the mandrel tray 28 is thrust forward to a loading position as indicated by the arrow A. At both the preceding position 30 and the succeeding position 32, the tray is withdrawn to a non-loading position. Of course, there may be other places and positions along the path of the conveyor chain 20 where the trays may be thrust forward or withdrawn.

Figure 1A:
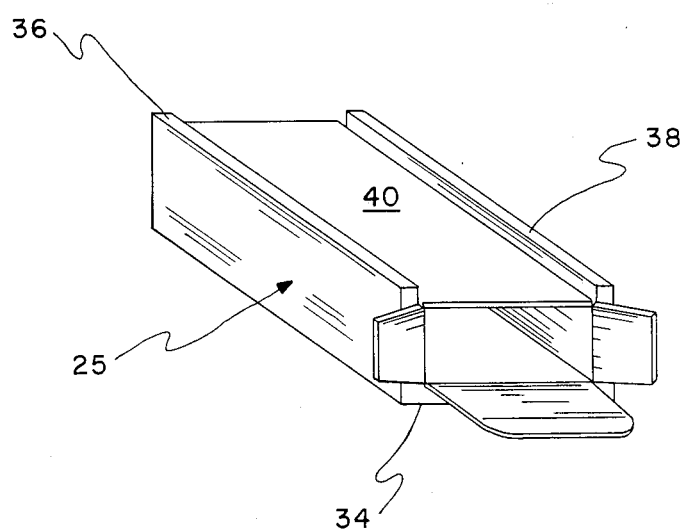
FIG. 1A is a perspective view of a mandrel tray holding an exemplary box or product, as the case may be.

Each of the trays 25 (FIG. 1A) has a floor 34 and two spaced parallel, upstanding flanges 36, 38 which receive and embrace the box or product 40 which is to be filled or to fill a box. It should be apparent that each tray is dedicated to the task of carrying a box or product having only one set of specific physical dimensions. Therefore, it is necessary to change trays every time that a box or product with new and different dimensions is to be filled. Heretofore, it has been common practice for a crew of service men to unbolt each mandrel and to remove it from the conveyor chain. Then, other mandrels having the physical dimensions of the new box are bolted onto the conveyor chain. This set-up process may consume hours.

According to the invention, means are provided for quickly and easily replacing the trays, by the use of the tray and carrier shown in FIGS. 2-5.

Figure 2:
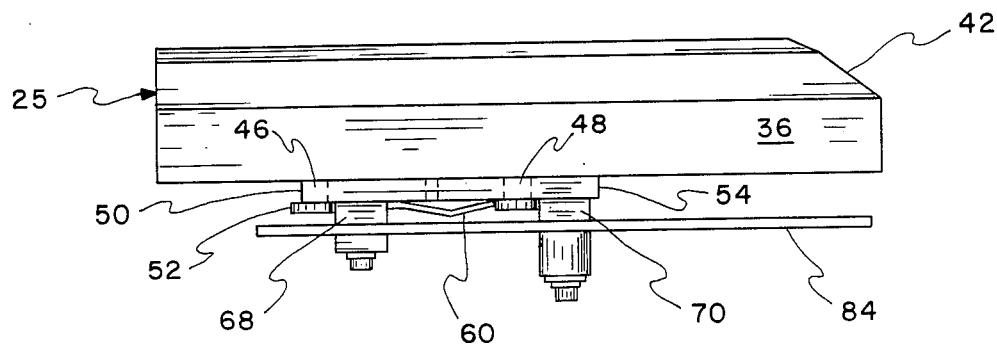
FIG. 2 is a side elevation view which shows the inventive mandrel with a tray and carriage which are coupled together.

As best seen in FIG. 5, the tray 25 has a floor 34 which is corrugated at 35 for added strength. The upstanding flanges 36, 38 have tapered corners 42, 44 which facilitate an insertion into an empty box or a filling device during a loading procedure. Dependant from the bottom 34 of the tray 25 are two inverted bolt-like interconnecting members 46, 48. Each of these bolt-like members comprises a shank 50 and a head 52 (FIGS. 2-4). The length of the shank 50 corresponds to the thickness of a suppport plate 54.

The support plate 54 contains a key hole slot 56 (FIG. 5) and a locking slot 58 which are separated by a distance corresponding to the distance between the bolt-like interconnecting members 46, 48. Therefore, when the head 52 on the interconnecting member 48 is fitted through the large part of the key hole 56, the tray may slide in direction B. The shanks 50, 50 slide into the small part of the key hole 56 and into the end locking slot 58. At the end of the slide in direction B, the tray 25 is firmly fixed in position on the plate 54.

A leaf spring 60 has an end 62 which is fixed onto the bottom of the plate 54, the opposite end 64 of the leaf spring being free to flex as the head 52 of the interconnector 48 passes between plate 54 and the spring. After the head 52 emerges from under the end 64, leaf spring 60 snaps down to lock the tray in place. Thereafter, the tray 34 can not move back in direction C, unless the end 64 of leaf spring 60 is first pushed far enough to enable the interconnector head 52 to pass over it.

Bolts 66 attach guide plates 68, 70 to the bottom of support plate 54. Depending from guide plates 68, 70 are spaced parallel flanges which fit into and slide along guide ways in the form of slots 78, 80, 82 in a carriage plate 84.

It should now be clear how the tray 25 may be moved along the length of the carriage plate 84, with the flanges 72, 74, 76 sliding back and forth in the guide way slots 78, 80, 82. This way the tray 25 may be in the withdrawn positions 30, 32 (FIG. 1) or in the extended position 28. The equipment for actually moving the tray between these two positions is irrelevant. Often, it is moved by plows mounted along the path followed by conveyor chain 20.

A hole 86 is formed in the bottom of the tray 25, at the point which is immediately above the leaf spring 60. Therefore, when a pin, indicated by dashed line 88 (FIG. 3), is pressed down (direction D) through the hole 86, end 64 of the leaf spring 60 is pressed downwardly far enough to enable the head 52 of the interconnector 48 to pass over it. As seen in FIG. 3, the tray 25 has moved about half-way from the locked to this unlocked position, the head 52 of interconnector 48 passing between leaf spring 60 and support plate 54. When the bolt-like interconnector 48 reaches the enlarged end of the key hole 56, the head 52 escapes from support plate 54 and tray 25 separates therefrom.

Thereafter a different tray 25, with physical dimensions which are adapted to hold the next box or product which is to be carried and is attached to the support plate 54 by having its bolt-like interconnector fitted through the key hole 56 and slid forward into the locking position (FIG. 2).

Thus, it is seen that the trays may be removed and replaced quickly and easily without disturbing the connection between the carriage plate 84 and the conveyor chain 20.

Those who are skilled in the art will readily perceive how to modify the system. Therefore, the appended claims are to be construed to cover all equivalent structures which fall within the true scope and spirit of the invention.

The invention which is claimed is:

1. A mandrel for an automatic packaging machine, said mandrel comprising a carriage plate having guide slots formed thereon for enabling a limited longitudinal motion, a support plate mounted on said carriage plate for movement along said guide slots, a tray having physical dimensions corresponding the physical dimensions of an object to be carried by said tray, interconnector means for joining said tray to said support plate in response to a sliding motion, leaf spring means for locking said tray to said support plate at the end of said sliding motion, and means formed in said tray for moving said leaf spring to unlock said tray from said carriage plate.

2. The mandrel of claim 1 wherein said support plate has flanges associated therewith for sliding within said guide slots.

3. The mandrel of claim 2 wherein said interconnector means comprises at least one bolt-like member which is dependent from the bottom of the tray, and a key hole formed in said support plate for receiving and passing a head on said bolt-like member after which a shank of said bolt-like member may slide in said key hole, said leaf spring passing over said head and pressing there against at the end of said slide.

4. The mandrel of claim 3 wherein said means formed in said tray comprises a hole located at a point immediately over said leaf spring to enable said spring to be depressed by a pin passing through said hole.

5. An automatic packaging machine comprising a conveyor means including a chain mounted to travel over a fixed and closed path, a plurality of carrier means mounted at fixed intervals along said conveyor chain to be carried over said closed path by said conveyor means, tray means mounted on said carrier means to carry an object having fixed physical dimensions, means for connecting said tray means to said carrier means, means for releasably locking said tray onto said carrier means when connected thereto, said carrier means including guide means for enabling said tray to be extended or retracted in a horizontal motion which is transverse to said conveyor chain, said guide means including at least one longitudinal slot extending along a plate, a support plate having at least one flange attached thereto for moving along said longitudinal slot, interconnecting means for joining said tray to said support plate, said interconnecting means includes at least two inverted, bolt-like means at positions displaced along the length of the support plate, a key hole in said support plate for a head on one of said bolt-like means to pass through and then slide along the length of said key hole, being captured in a small end of said key hole slot, and a locking slot in which the other of the bolt-like means is captured.

6. The packaging machine of claim 5 wherein said locking means is a leaf spring for snapping over the head of said one bolt as it slides in said key hole slot, and means for flexing said leaf spring away from said one bolt head to release said tray.